(12) United States Patent
Cuillery

(10) Patent No.: US 9,125,524 B2
(45) Date of Patent: Sep. 8, 2015

(54) REMOVABLE GRIPPING DEVICE FOR A COOKING VESSEL EQUIPPED WITH NON-RETURN MEANS FOR TWO ARMS

(71) Applicant: SEB S.A., Ecully (FR)

(72) Inventor: Pascal Cuillery, Faverges (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/190,889

(22) Filed: Feb. 26, 2014

(65) Prior Publication Data

US 2014/0239654 A1 Aug. 28, 2014

(30) Foreign Application Priority Data

Feb. 27, 2013 (FR) ...................................... 13 51708

(51) Int. Cl.
- A47J 45/00 (2006.01)
- A47J 45/07 (2006.01)
- A47J 45/10 (2006.01)

(52) U.S. Cl.
CPC . *A47J 45/07* (2013.01); *A47J 45/10* (2013.01)

(58) Field of Classification Search
CPC .................................. A47J 45/07; A47J 45/10
USPC .............. 294/31.1, 28, 29, 30, 116; 16/110.1, 16/422, 425; 220/759, 769, 762–764
See application file for complete search history.

(56) References Cited

U.S. PATENT DOCUMENTS

| | | | |
|---|---|---|---|
| 2,149,910 A * | 3/1939 | Clow | 294/104 |
| 6,257,439 B1 * | 7/2001 | Hsu | 220/759 |
| 7,883,129 B2 * | 2/2011 | Jung et al. | 294/34 |
| 8,365,948 B2 * | 2/2013 | Lorthioir | 220/759 |
| 2011/0005037 A1 * | 1/2011 | Kim | 16/422 |
| 2011/0284565 A1 * | 11/2011 | Corbin et al. | 220/759 |
| 2014/0158701 A1 * | 6/2014 | Bonnel et al. | 220/759 |
| 2014/0239005 A1 * | 8/2014 | Cuillery | 220/759 |

FOREIGN PATENT DOCUMENTS

FR 2937237 A1 * 4/2010 ............. A47J 45/07

* cited by examiner

*Primary Examiner* — Saul Rodriguez
*Assistant Examiner* — Gabriela Puig
(74) *Attorney, Agent, or Firm* — The Webb Law Firm

(57) ABSTRACT

The device comprises two gripping arms movable to and from a resting position and a gripping position in which they are spread apart from one another and in contact with an inside face of the side wall of the cooking vessel; a fix-mounted gripping member designed for being in contact with an outside face of the side wall of the cooking vessel; and displacement means designed for being manually guided to and from an open position and a closed position and for effecting a spreading of the movable arms while switching from the open position to the closed position. Said device further comprises anti-return means separate from the displacement means and designed for being moved from a resting position to a clamping position in which they are inserted between the two arms and prevent the two arms from coming together.

13 Claims, 3 Drawing Sheets

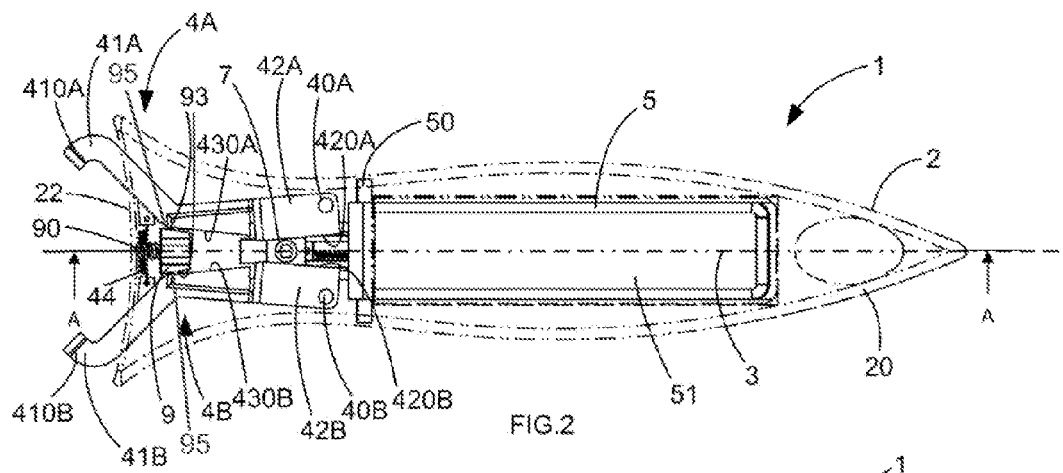
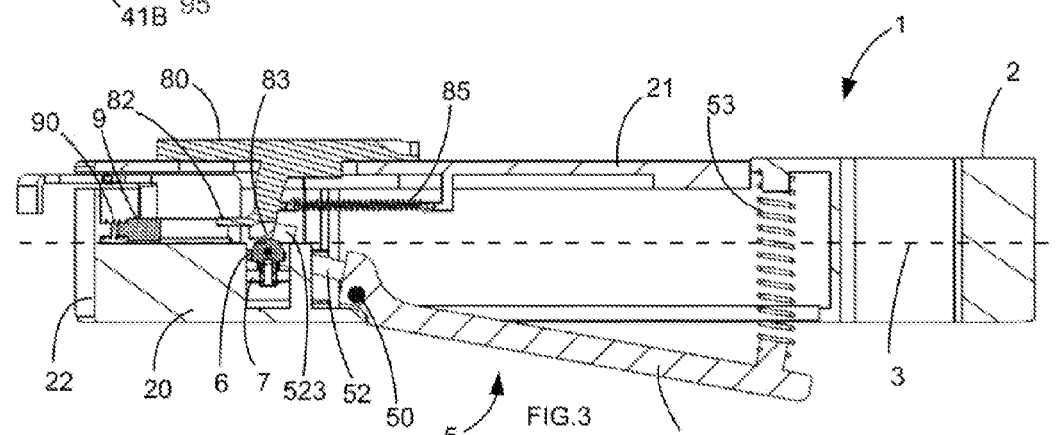
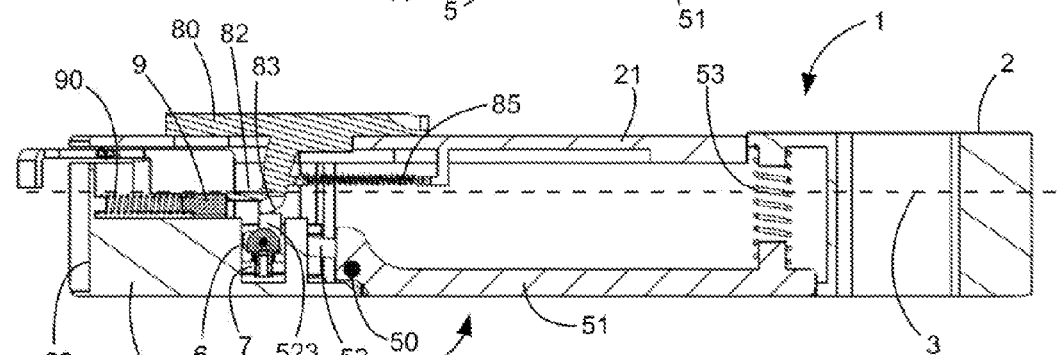
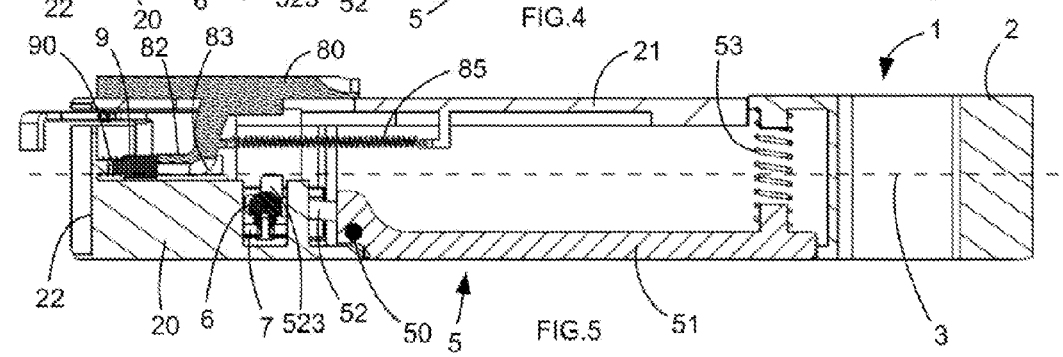

REMOVABLE GRIPPING DEVICE FOR A COOKING VESSEL EQUIPPED WITH NON-RETURN MEANS FOR TWO ARMS

This application claims priority to French Patent Application No. 1351708 filed Feb. 27, 2013, the disclosure of which is hereby incorporated in its entirety by reference.

BACKGROUND OF THE INVENTION

1. Field of the Invention

The invention relates to a removable gripping device for a cooking vessel.

2. Description of Related Art

The gripping device of the invention is more precisely one that comprises two gripping arms that are movable to and from a resting position and a gripping position in which they are spread apart from one another and in contact with an inside face of a side wall of the cooking vessel, a fix-mounted gripping member designed to be in contact with an outside face of the side wall of the cooking vessel, and displacement means designed to be manually guided to and from an open position and a closed position and to effect a spreading of the movable arms when switching from the open position to the closed position. An example of such a gripping device is described in document FR 2 937 237.

During use the two spread-apart arms and the fixed member work together to grip the wall by means of three separate contact surfaces. The wall is compressed in a circular arc, thus ensuring a firm grip without the need for excessive clamping forces. It is thus possible to reduce premature wear of the coating of the vessel. During use and in particular when the gripping device is subjected to dynamic stresses such as those linked to cooking sautéed foods or flipping crêpes, however, significant play between the gripping device and the vessel occurs.

SUMMARY OF THE INVENTION

The present invention aims to improve this situation.

To this end, the invention relates to a removable gripping device for a cooking vessel, said vessel having a side wall, said device comprising two gripping arms movable to and from a resting position and a gripping position in which they are spread apart from one another and in contact with an inside face of the side wall of the cooking vessel;

a fix-mounted gripping member designed to be in contact with an outside face of the side wall of the cooking vessel;

displacement means designed to be guided manually to and from an open position and a closed position and to effect a spreading of the movable arms when switching from the open position to the closed position, characterized in that it comprises anti-return means separate from the displacement means and designed to be moved from a resting position to a clamping position in which they are inserted between the two arms and prevent the two arms from coming together.

Thanks to the invention, the anti-return means prevent a return, i.e., a coming together, of the arms when they are spread apart in the adjusted gripping position. The adjusted spreading of the arms is locked, thus eliminating play between the gripping device and the vessel.

The device advantageously comprises an unclamping member designed to be guided manually to and from a clamping position and an unclamping position and to drive the anti-return means from their locking position to their resting position. The anti-return means can thus be disengaged in order to allow a coming together of the arms via a user's manual control.

In a particular embodiment, the device comprises elastic means designed to effect a displacement of the anti-return means from their resting position to their clamping position as the arms spread apart. As a result the displacement of the anti-return means is effected by the return action of the elastic means as the arms spread apart.

The anti-return means advantageously comprise two clamping walls and the two arms advantageously have two respective, corresponding clamping surfaces, the clamping walls and clamping surfaces being designed to cooperate by wedging so as to lock the two arms in the spread position.

As a result a clamping is achieved independently of the position of the arms. The clamping is effective regardless of the thickness or diameter of the wall. Advantageously still, since the device extends along a longitudinal axis, when the anti-return means are in the clamping position the clamping surfaces of the arms are inclined relative to the longitudinal axis at a tilt angle of between 5° and 30°.

The efficacy of the wedging effect varies in relation to the tilt angle.

In a first embodiment, the two clamping surfaces bear rollers and the two contact surfaces are running surfaces for the rollers. In this case a clamping is achieved by a wedging of the rollers, the housings of which form clamping ramps, against the clamping surfaces of the arms.

In a second embodiment, the two clamping walls of the anti-return means comprise sliding surfaces intended to slide on the two clamping surfaces of the arms. In this case; clamping is achieved by a wedging effect between the anti-return means and the arms.

The sliding surfaces advantageously have a sliding friction coefficient greater than 0.05. They can be produced from a POM or PTFE polymer material.

In a third embodiment, the anti-return means comprise a toothed piece and the two arms each have gear racks. The anti-return means can be designed for horizontal displacement or for vertical displacement.

The displacement means can comprise a lever movable in rotation to and from an open position and a closed position, a cam designed for transforming the rotary motion of the lever from the open position to the closed position into a translational motion effecting a spreading of the arms.

The lever and the unclamping member advantageously have two respective contact surfaces designed to cooperate in such a way that the unclamping member is held in an intermediate position as the lever rotates from the open position to the closed position and the displacement of the unclamping member from the intermediate position to the clamping position is effected under the action of elastic means when the lever is in the closed position.

Advantageously still, in the clamping position the unclamping member is designed to lock the lever in the closed position.

The invention also relates to an array having a cooking vessel and at least one gripping device as defined above.

BRIEF DESCRIPTION OF THE DRAWINGS

The invention will be more clearly understood by studying the following description of several exemplary embodiments of the removable gripping device for a cooking vessel according to the invention, with reference to the appended drawings in which:

FIG. 2 illustrates a view from below of the gripping device of FIG. 1 in the resting position (corresponding to an open position of the lever);

FIG. 3 illustrates an A-A cutaway view of the gripping device of FIG. 1 in the resting position;

FIG. 4 illustrates an A-A cutaway view of the gripping device of FIG. 1 in the gripping position after locking;

FIG. 5 illustrates an A-A cutaway view of the gripping device of FIG. 1 in the gripping position right after unlocking.

DESCRIPTION OF THE INVENTION

Figure 1:
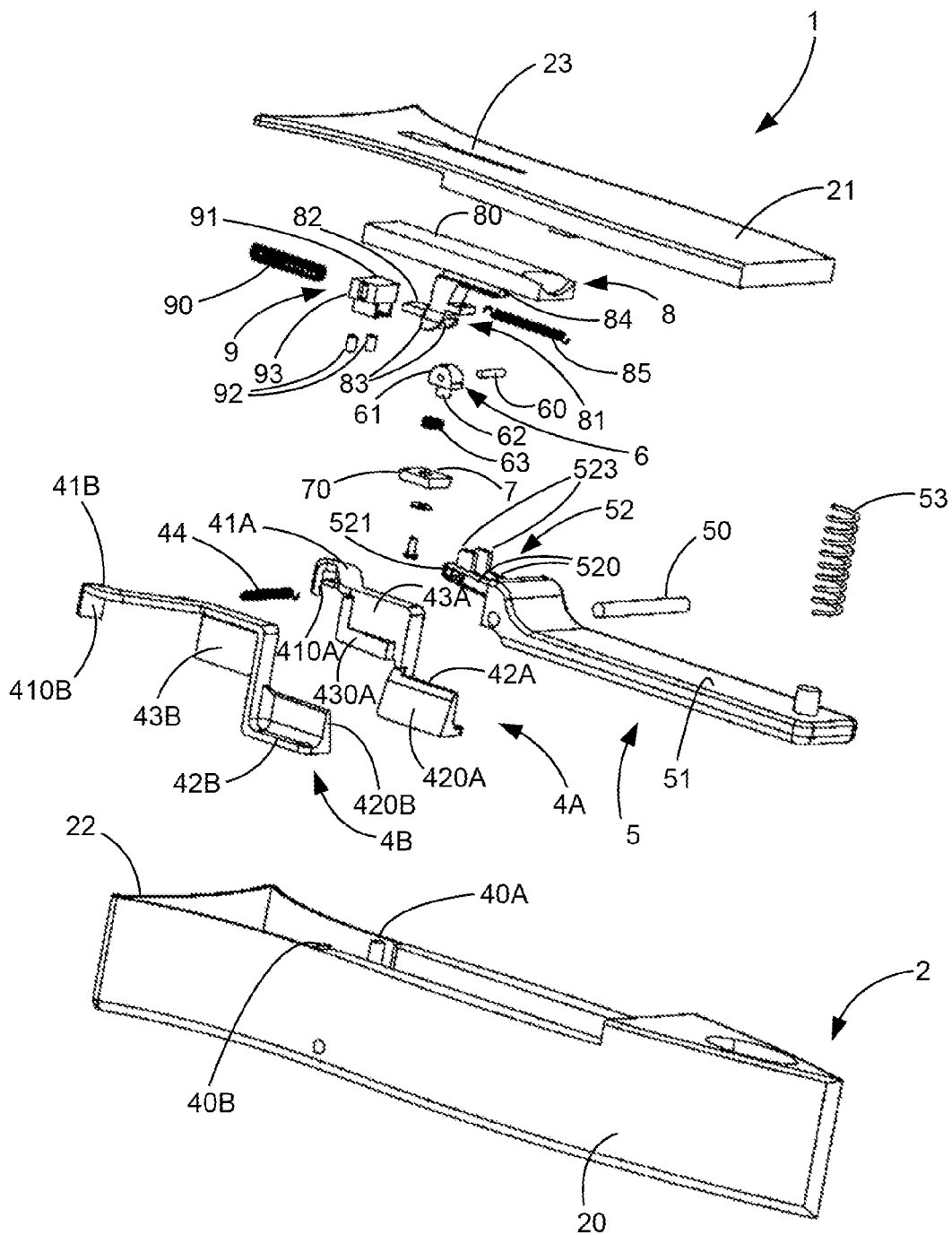
FIG. 1 illustrates an exploded view of the gripping device according to a first exemplary embodiment.
Figure 6:
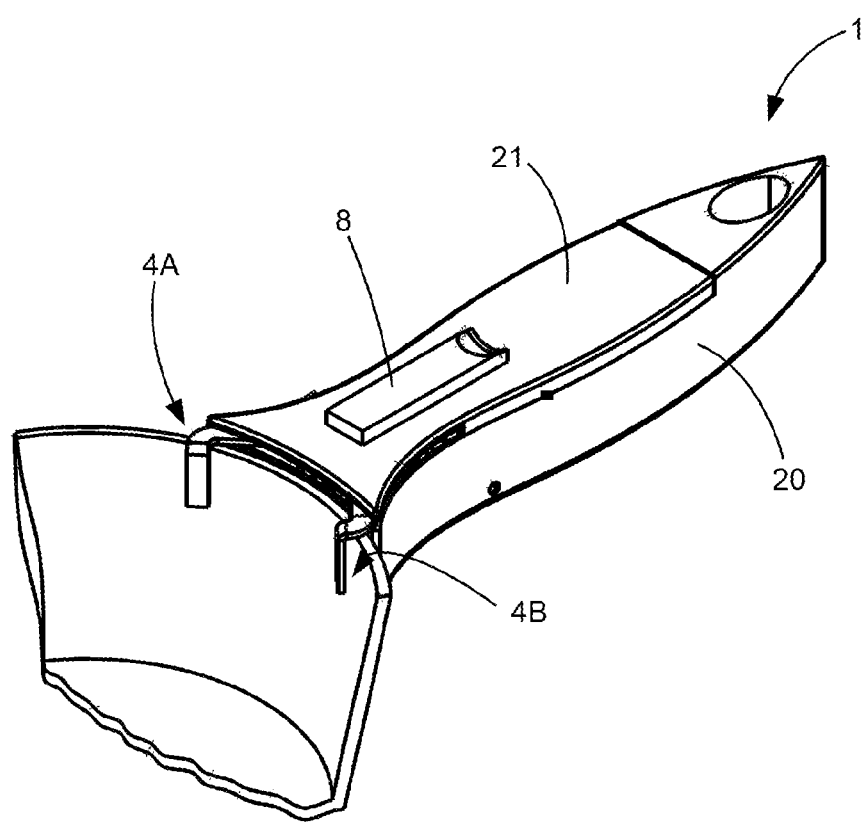
FIG. 6 illustrates a view of the gripping device mounted on a wall (partially shown) of a cooking vessel.

For the sake of clarity, at this point mention is made that the corresponding elements of different exemplary embodiments have the same reference signs unless indicated otherwise.

The figures illustrate a removable gripping device 1, commonly known as a "handle" or "removable handle", according to a first exemplary embodiment. The device 1 is intended to be mounted on a side wall of a cooking vessel and then removed, by a user, in order to facilitate the storage of the cooking vessel. Once mounted on the cooking vessel, the device 1 makes it possible to move the latter.

The cooking vessel can be a casserole, a skillet, a Dutch oven, or any other cooking utensil typically provided with a handle. This vessel has a side wall by which it can be grasped by the gripping device 1.

At this point mention is made that in the description that follows, the terms "horizontal", "vertical", "lower", "upper", "longitudinal", "transverse", "top", "bottom", "front", "back/rear", etc. used to describe the gripping device 1 refer to this device 1 in a use situation, when it is mounted a side wall of a cooking vessel, which vessel is placed in a horizontal position.

The gripping device 1 comprises a gripping body 2 extending chiefly along a longitudinal axis 3. During use, when the device 1 is mounted on an essentially vertical side wall of a cooking vessel, the gripping body 2 extends through a horizontal or substantially horizontal plane containing the longitudinal axis 3.

The device 1 has a bottom shell 20 and a top cover 21 assembled by gluing, soldering, brazing, nuts and screws, or any other appropriate assembly means. The bottom shell 20 comprises a front wall 22 designed to be in contact with an outside face of the side wall of the cooking vessel.

The gripping device 1 also has two pivoting arms 4A, 4B mounted pivotably about two respective vertical pivot pins 40A, 40B. The two arms 4A, 4B are symmetrical to one another in relation to a vertical median plane of symmetry (not shown) denoted PS and containing the longitudinal axis 3. Each arm 4A (4B) comprises a front section 41A (41B), a back section 42A (42B), and a middle section 43A (43B).

The front section 41A (41B) of each arm 4A (4B) has a front free end portion bent downwards so as to form, on the back of this bent front portion, an inside contact surface 410A (410B) designed to be in contact with an inside face of the side wall of the cooking vessel.

The back sections 42A, 42B have two respective planar spacer surfaces 420A, 420B essentially opposite one another and inclined from the vertical by an angle θ (not shown) with a value of 15° here and flaring upwards in relation to one another essentially in a V. These two surfaces 420A, 420B are designed to cooperate with a wedge 7 interposed between the two surfaces 420A and 420B in order to effect a spreading of the two arms 4A, 4B during a vertical downward translation of the wedge 7, as will be described further below.

The middle sections 43A and 43B of the arms 4A and 4B also have two respective clamping surfaces 430A, 430B. These clamping surfaces 430A, 430B are designed to cooperate with an anti-return part 9 for locking the arms 4A, 4B in the spread-apart gripping position, as will be described further below.

The surfaces 430A and 430B, which face one another, are flat and vertical. They are inclined relative to the plane of symmetry PS and forwardly flared relative to another in a V. The tilt angle (not shown) of each clamping surface 430A (430B) relative to the longitudinal axis 3 is denoted α. This angle α varies in relation to the spreading of the arms 4A and 4B.

When the arms 4A, 4B are in the resting, non-spread position, the angle α has a minimum value α1. In the specific example described here, α1 equals 6.25°. When the gripping device 1 is mounted on a vessel and when the arms are spread apart in the gripping position, this angle α has a maximum value α2. This angle value α2 equals 11° in the specific example described here. The angle value α2 can be in the range of 5° and 30°. The smaller the angle value α2, the more effective the clamping; however, greater effort is required for unclamping. Conversely, the greater the angle value α2, the easier the unclamping is. The intensity of the clamping forces, however, remains weak. The angle value α2 can be adjusted according to the friction coefficient of the anti-return part 9 against the surfaces 430A/B in order to obtain an optimum clamping force (sufficiently strong to be effective, sufficiently weak to be unlocked). This maximum tilt angle value α2 depends upon the vessel, and more precisely upon the shape, the curvature, and the thickness of its side wall.

In actual practice the range of maximum α2 values for the tilt angle α of the clamping surfaces 430A, 430B (between 5° and 30°) represents angle values for achieving a butting. The butting, however, can work for any angle value of which the tangent is smaller than the friction coefficient. Increasing the friction coefficient between the clamping surfaces 430A, 430B and the anti-return part 9 is thus sufficient for increasing the tilt angle of the clamping surfaces 430A, 430B while still maintaining their efficacy.

The front sections 41A and 41B of the arms are connected by return spring 44, which is intended to return the arms 4A, 4B to the resting position in which they are together.

The gripping device 1 comprises a displacement element or system designed to be displaced manually to and from an open position and a closed position, and to effect a spreading of the arms 4A, 4B when switching from the open position to the closed position. This displacement element comprises a lever 5 that is rotatably or pivotably movable to and from an open position and a closed position, and a cam 6.

The lever 5 is pivotably mounted about a transverse (orthogonal to the median plane of symmetry PS) pivot pin 50 fix-mounted on the bottom shell 20. The lever 5 comprises a lever arm 51 in back of the pivot pin 50 and an actuating front section 52 in front of the pivot pin 50.

In the open position, the lever arm 51 is lowered, angled relative to the longitudinal axis 3, and extends under the bottom shell 20 under the pushing action of a return spring 53 mounted between the top cover 21 and the back end section of the lever arm 51. In the closed position, the lever arm 51 is raised again, the spring 53 being compressed, and extends parallel to the longitudinal axis 3 in the extension of the bottom wall of the shell 20. The lever 5 is designed to be pivoted from its open position as shown in FIG. 3 to its closed position as shown in FIG. 4 under the manual action of a user.

The front section 52 comprises two forward-projecting fingers 520 forming a space between themselves for receiving the cam 6 and through which pass two respective longitudinally elongated holes 521 for receiving a transverse pivot pin 60 on which the cam 6 is mounted. In addition, the fingers 520 bear two upper stops 523.

The cam 6 comprises a head 61 bearing an essentially semi-cylindrical upper surface having the pivot pin 60 as a central axis, the head being prolonged downwards by a lower tappet 62. It is mounted on the front section 52 of the lever 5 via a sliding pin connection formed by the pivot pin 60 and the holes 521 and is vertically displaceable when the lever 5 pivots to and from its open position and its closed position, as will be described further below. The lower tappet 62 is secured to a wedge-forming part 7. Here the wedge 7 and the tappet 62 are assembled by screwing. A spring joint 63 is interposed between the wedge 7 and the cam head 61 and surrounds the tappet 62. During use, the pivoting of the lever 5 from its open position to its closed position effects a downward vertical displacement of the cam 6 and of the wedge 7. Here the wedge 7 has the shape of a flat parallelepiped having two beveled sides 70 extending in two inclined planes flaring inwardly toward the bottom.

The gripping device 1 likewise comprises an unclamping member 8 having a top manual control button 80, a bottom finger 81, a front tappet 82, and two bottom stops 83. The control button 80 slides on the cover 21 by means of a runner 84 interposed between the top button 80 and the bottom finger 81, and guided by a slide-forming longitudinal slot 23 formed in the cover 21.

The front tappet 82 extends forward in the longitudinal direction of the axis 3 and is designed to push the anti-return part 9 forward when the control button 80 is moved forward manually, as will be described further below.

The bottom stops 83 extend downward and have two bottom sides with a rounded profile, essentially a quarter circle here. The stops 83 and the stops 523 are designed to cooperate so as to push the unclamping member 8 forward during the switching of the lever 5 from the open position to the closed position on the one hand;

to lock the lever 5 when it is in the closed position on the other.

A return spring 85 is mounted between the unclamping member 8 and the cover 21.

This spring 85 acts so as to return the unclamping member 8 backwards until it attains a resting position in which the runner 84 is in abutment with the cover 21, at the back of the slot 23.

The aforementioned anti-return part 9 is designed to be moved from a resting position to a clamping position in which it is inserted between the two arms 4A, 4B and prevents the latter from coming together. The anti-return part 9 comprises a body 91 forming a support cage for two lateral rollers 92. The body 91 comprises a front wall and a rear wall, in this case vertical and perpendicular to the longitudinal axis 3 and joined by two clamping side walls 93, which are vertical and oblique and flared inwardly toward the back. The tilt angle (not shown) of each side wall of the anti-return part relative to the longitudinal axis 3 is denoted β. Here this angle β is close to the tilt angle α2 of the side walls 430A and 430B of the arms 4A and 4B. The lateral rollers 92, which rotate in the housings formed in the body 91, are designed to roll against the oblique clamping surfaces 430A, 430B. A return spring 90 is mounted between the anti-return part 9 and the front wall 22 of the shell 20. The anti-return part 9 is movable in longitudinal translation along the axis 3 to and from a front resting position (FIG. 3), in which the spring 90 is compressed, and a rear clamping position (FIG. 4), in which the anti-return part 9 is inserted, under the rearward pushing action of the spring 90, between the two middle sections 43A, 43B of the two arms 4A, 4B, which are spread apart from one another, and prevents the two arms 4A, 4B from coming together.

The mounting of the gripping device 1 on the side wall of a cooking vessel and the removal thereof shall now be described with reference to FIGS. 3 through 5.

Initially, the lever 5 of the gripping device 1 is in the open position as shown in FIG. 3. In this open position, the back of the lever arm 51 of the lever 5 is pushed downwards under the return action of the spring 53. The arms 4A and 4B come together, as shown in FIG. 2, under the return action of the spring 44. The anti-return part 9 is held in a forward, resting position by the two arms 4A, 4B that have come together, the spring 90 thus being compressed. More precisely, it is pinched between the two surfaces 430A and 430B, at the front of the middle parts 43A, 43B of the arms 4A, 4B.

Furthermore, in the open position of the lever 5, the fronts of the front stops 523 come in contact with the backs of the bottom stops 83. This has the effect of holding the unclamping member 8 in a middle position, shifted slightly forwards relative to its rear resting position, against the return action of the spring 85.

In order to mount the device 1 on the vessel, a user maneuvers the gripping device 1 so as to lodge the side wall of the vessel between the front wall 22 of the bottom shell 20 and the arms 4A, 4B.

The lever 5 is then actuated by the user by an upward pivoting of the lever arm 51 about the pivot pin 50, against the return action of the spring 53. The upward pivoting of the lever arm 51 is accompanied by a downward pivoting of the front section 52 of the lever 5, which effects a downward movement in vertical translation of the wedge 7 by means of the sliding pin connection constituted by the pin 60 and the holes 521. During this movement, the side walls 70 of the wedge 7 slide against the rear walls 420A, 420B of the arms 4A and 4B and effect a sideways spreading of the arms 4A and 4B apart from one another.

During the spreading of the arms 4A, 4B, the anti-return part 9 is pushed backwards by the spring 90 and is then inserted between the arms 4A, 4B. The rollers 92 glide along and against the walls 430A, 430B constituting running surfaces.

After the arms 4A, 4B are spread apart, the front free end sections of the arms 4A, 4B, and more precisely the surfaces 410A, 410B, come into contact and abutment with the inside face of the wall of the vessel and the front wall 22 of the bottom shell 20 comes into contact with the outside face of the wall of the vessel. In this position, the anti-return part 9 cooperates by pressure with the oblique walls 430A and 430B of the arms 4A and 4B in order to clamp the arms in the spread apart position by wedging of the rollers 92 against the side walls 430A/430B of the arms 4A/4B. The housings of the rollers serve as clamping ramps, as in an overrun clutch. It should be noted that the anti-return part 9, clamped between the arms 4A, 4B, by the wedging of the rollers 92 between the two clamping walls 430A, 430B, renders the spreading irreversible. The angling of the walls 93 and the corresponding angling of the clamping walls 430A, 430B help reinforce the clamping effect of the gripping. The arms 4A/4B are thus locked in the gripping position by a wedging effect.

After the front ends of the arms 4A, 4B are brought into abutment with the wall of the vessel, the spring 53 and the spring joint 63 remain compressed under the manual closing action exerted upwardly by the user on the lever arm 51 until the lever 5 reaches the closed position shown in FIG. 4. As a result the gripping device is adaptable to different vessel wall thicknesses or shapes. Once this position is reached, the stops 523 pass under the stops 83 and release the unclamping member 8 in rearward translation. The unclamping member 8 then moves rearward in translation under the return action of the spring 85, and switches from an intermediate position like or nearly like the one shown in FIG. 3 to the rear resting position shown in FIG. 4. When the unclamping member 8 is in the rear resting position, the stops 83 are positioned above the stops 523 and in contact therewith. This has the effect of locking the lever 5 in the closed position.

The user can then stop the actuation of the lever arm 51. The gripping device is mounted on the cooking vessel, which can be moved by means of the gripping device. It should be emphasized that the anti-return part 9, wedged between the two arms 4A, 4B, enables a significant reduction of the play between the gripping device 1 and the vessel, even in the case of horizontal and vertical dynamic stresses.

To remove the gripping device 1, the user must manually actuate the unclamping member 8 by pushing the button 80 forward in a translational movement guided by the slot 23. This has the effect of releasing the lever 5 on the one hand and effecting a disengagement of the anti-return part 9 in the forward direction on the other, as explained below.

When the unclamping member 8 is moved forward as shown in FIG. 5, the stops 83 release the stops 523 such that the pivoting of the lever 5 in the opening direction (opposite to the closing direction) is no longer blocked. Under the pushing action of the spring 53, the lever 5 thus released pivots in the opening direction, the back of the lever arm 51 pivoting downward. As the lever 5 opens, the wedge 7 ascends vertically.

Additionally, the tappet 82 of the unclamping member 8 comes into contact with the rear wall of the anti-return part 9 and pushes it forward in translation against the return action of the spring 90. The anti-return part 9 is thus moved from its clamping position to its resting position, as shown in FIGS. 2 and 3.

Lastly, under the return action of the spring 44, the two arms 4A, 4B come together and return to the resting position, as described previously.

Instead of being designed for horizontal displacement of the anti-return part 9, the anti-return system could be designed for vertical displacement of the anti-return part 9.

In a second exemplary embodiment, the side walls 93 of the anti-return part 9 and the clamping surfaces 430A, 430B of the arms 4a, 4B comprise sliding surfaces intended to slide against one another during the movement in rearward or forward translation of the anti-return part 9. The sliding friction coefficient of the surfaces 93, 430A, and 430B can be greater than 0.05. The surfaces 93, 430A, and 430B can be produced from a POM or PTFE polymer material. In this case, the clamping of the arms in the gripping position is brought about by a wedge effect between the lateral surfaces 93 of the anti-return part 9 and the surfaces 430A/430B of the arms 4A/4B. The surfaces 93 can be rounded in order to limit the friction forces during the gripping.

In a third exemplary embodiment, the anti-return part 9 is toothed. For example, its side walls 93 bear notches. In this case, the arms 4A/4B have corresponding gear racks instead of clamping surfaces (running or sliding surfaces).

Instead of being mounted movably in rotation, the arms could be movable in translation.

The invention also relates to an array having the gripping device 1 and a cooking vessel.

The invention claimed is:

1. Removable gripping device for a cooking vessel, said vessel having a side wall, said device comprising:
   two gripping arms movable to and from a resting position and a gripping position in which they are spread apart from one another and in contact with an inside face of the side wall of the cooking vessel;
   a fix-mounted gripping member designed to be in contact with an outside face of the side wall of the cooking vessel;
   displacement means designed to be manually guided to and from an open position and a closed position and to effect a spreading of the movable arms when switching from the open position to the closed position,
   wherein the device comprises anti-return means separate from the displacement means and designed to be displaced from a resting position to a clamping position in which the anti-return means are inserted between the two arms and prevent the two arms from coming together, and
   wherein the anti-return means comprise two clamping walls and the two arms comprise two respective, corresponding clamping surfaces, the clamping walls and the clamping surfaces being designed to cooperate by wedging so as to lock the two arms in the spread position.

2. Device as in claim 1, wherein the device comprises an unclamping member designed to be guided manually to and from a clamping position and an unclamping position and to drive the anti-return means from their clamping position to their resting position.

3. Device as in claim 1, wherein the device further comprises elastic means designed to effect a displacement of the anti-return means from their resting position to their clamping position as the arms spread apart.

4. Device as in claim 1, wherein the device extends along a longitudinal axis, the clamping surfaces of the arms are angled relative to the longitudinal axis at a tilt angle of between 5° and 30° when the anti-return means are in the clamping position.

5. Device as in claim 1, wherein the two clamping walls of the anti-return means bear rollers and the two clamping surfaces of the arms are running surfaces for the rollers.

6. Device as in claim 1, wherein the two clamping walls of the anti-return means comprise sliding surfaces intended to slide on the two clamping surfaces of the arms.

7. Device as in claim 6, wherein the sliding surfaces of the anti-return means have a sliding friction coefficient greater than 0.05.

8. Device as in claim 6, wherein the sliding surfaces of the anti-return means are produced from a POM or PTFE polymer material.

9. Device as in claim 1, wherein the anti-return means are designed for horizontal displacement.

10. Device as in claim 1, wherein the displacement means comprise a lever movable in rotation to and from an open position and a closed position, a cam designed for transforming the rotary motion of the lever from the open position to a closed position, the lever transformed into a translational motion effecting a spreading of the arms.

11. Device as in claim 10, wherein the lever and an unclamping member have two respective contact surfaces designed to cooperate in such a way that the unclamping member is held in an intermediate position as the lever rotates from the open position to the closed position; and the displacement of the unclamping member from the intermediate position to the clamping position is effected, under the action of elastic means, when the lever is in the closed position.

12. Device as in claim 11, wherein in the clamping position, the unclamping member is designed for locking the lever in the closed position.

13. Array having a cooking vessel and at least one gripping device as in claim 1.

* * * * *